United States Patent [19]
Edera

[11] Patent Number: 5,457,764
[45] Date of Patent: Oct. 10, 1995

[54] DIFFUSOR DEVICE WITH EXTRACTABLE SEMICONNECTORS, INTEGRATED IN A PLASTIC CARD, FOR THE TERMINATION OF OPTICAL FIBER RIBBON CABLES

[76] Inventor: Egisto Edera, Corso Semonte 59, Gubbio PG 06024, Italy

[21] Appl. No.: 170,232

[22] PCT Filed: May 21, 1992

[86] PCT No.: PCT/IT92/00055

§ 371 Date: Dec. 29, 1993

§ 102(e) Date: Dec. 29, 1993

[87] PCT Pub. No.: WO93/22695

PCT Pub. Date: Nov. 11, 1993

[30] Foreign Application Priority Data

Apr. 30, 1992 [IT] Italy ............................ RM92A0328

[51] Int. Cl.[6] .................................................. G02B 6/36
[52] U.S. Cl. ..................... 385/135; 385/134; 385/114; 385/55; 385/59
[58] Field of Search ........................... 385/135, 134, 385/137, 136, 114, 96, 98, 55, 59, 14, 53

[56] References Cited

U.S. PATENT DOCUMENTS

| | | | |
|---|---|---|---|
| 4,765,709 | 8/1988 | Suillerot et al. | 385/135 |
| 4,976,510 | 11/1990 | Davila et al. | 385/53 |
| 5,206,927 | 4/1993 | Finzel et al. | 385/135 |
| 5,212,761 | 5/1993 | Petrunia | 385/135 |
| 5,235,665 | 10/1993 | Marchesi et al. | 385/135 |

FOREIGN PATENT DOCUMENTS

| | | | |
|---|---|---|---|
| 0463749 | 2/1992 | European Pat. Off. | G02B 6/44 |
| 0474091 | 11/1992 | European Pat. Off. | G02B 6/36 |

*Primary Examiner*—Brian Healy
*Attorney, Agent, or Firm*—Beveridge, DeGrandi, Weilacher & Young

[57] ABSTRACT

A compact diffusion device for optical fiber ribbons allows individual connection of all fibers on the net side with those of the apparatus side by means of a semiconnector MT4 and four semiconnectors SC-2. In this manner, one optical fiber ribbon is divided into four single fibers.

16 Claims, 4 Drawing Sheets

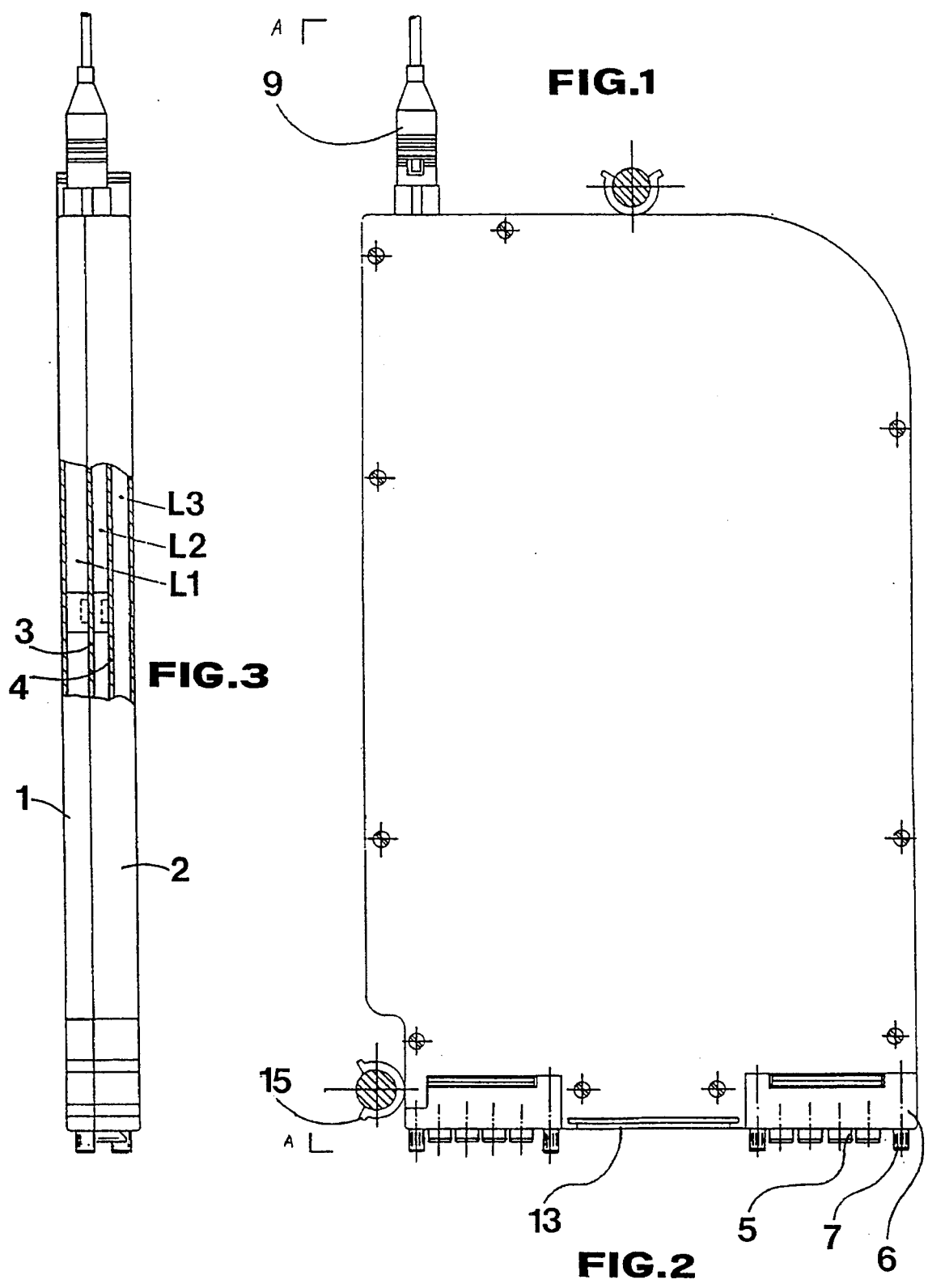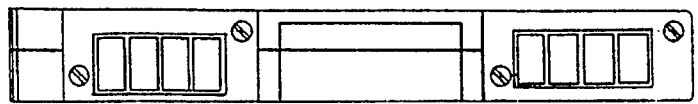

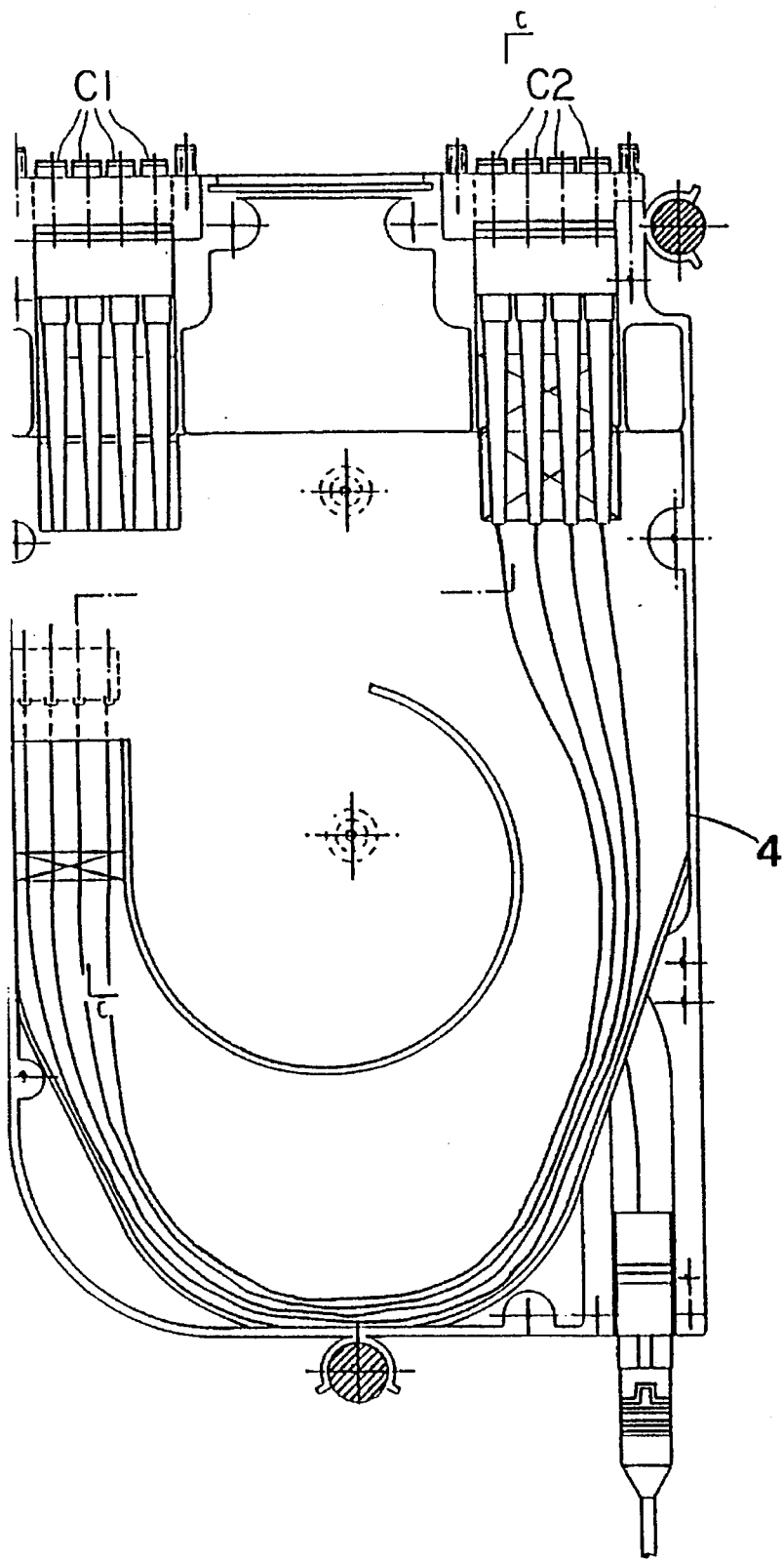
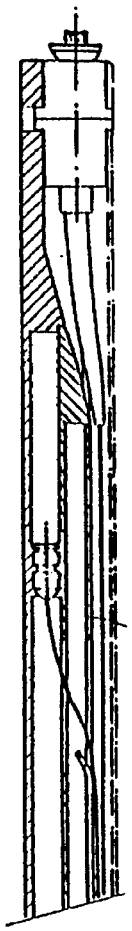
FIG.7
FIG.8

DIFFUSOR DEVICE WITH EXTRACTABLE SEMICONNECTORS, INTEGRATED IN A PLASTIC CARD, FOR THE TERMINATION OF OPTICAL FIBER RIBBON CABLES

BACKGROUND OF THE INVENTION

The present invention concerns a diffusing device with extractable semiconnectors, integrated in a plastic card, for facilitating the termination of optical fiber ribbon cables.

At present, diffusors are known for central exchangers which divide a ribbon of four optical fibers, coming from the net side, into single fibers abutting to connectors SC-2. These diffusors are extremely expensive due to the complex realization process, and furthermore, they are not compact.

A card provided for the same purpose is also known, containing rigidly fixed semiconnectors, which are available only if the card is completely disassembled. Thus, this card system has an evident negative aspect in use.

SUMMARY OF THE INVENTION

It is the aim of the present invention to provide a compact diffusor device for the termination of fiber optic ribbon cables, wherein the device is functional, simple and cheap.

The aim set forth is reached by means of the diffusor device according to the present invention, comprising extractable semiconnectors which are integrated in a plastic card, for individually connecting all fibers on the net side with those on the apparatus side by means of a semiconnector MT4 and four semiconnectors SC-2. In this manner, one optical fiber ribbon is divided into four independent optical fibers.

The main advantages of the compact diffusor device according to the present invention are:

low cost;

ease of installation in all existing frames and exchangers, with negligible modifications;

small size and compactness;

ease of eventual replacement, but, most of all, ease of maintenance, because it is possible to perform any cleaning operations on all semiconnectors and sleeves outside the card, by means of simply unscrewing two screws, without particular care or special procedures.

BRIEF DESCRIPTION OF THE DRAWINGS

The present invention is described in more detail hereinbelow according to the enclosed drawings in which a preferred embodiment is shown.

FIGS. 1 and 2, respectively, show the plant and the lateral views of a diffusor device with extractable semiconnectors, integrated in a plastic card, for the termination of fiber optic ribbon cables.

FIG. 3 shows the view A—A and a partial cross section.

FIGS. 4, 5 and 7, respectively, show the plant views of the three levels L1, L2 and L3.

FIGS. 6 and 8, respectively, show sections B—B and C—C.

DETAILED DESCRIPTION OF THE PREFERRED EMBODIMENT

Figure 4:
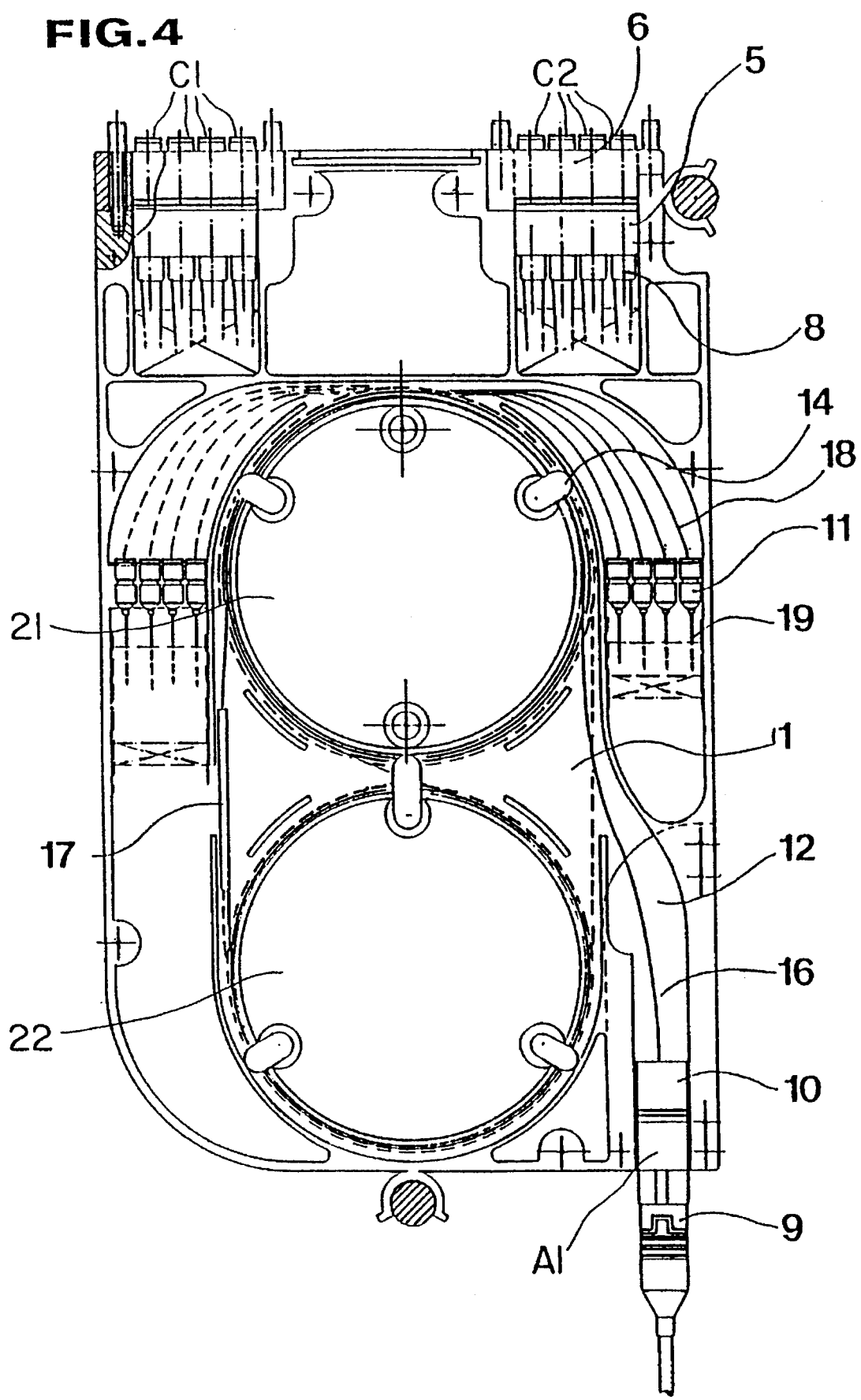

The figures show a diffusor device with extractable semiconnectors, integrated in a plastic card, for the termination of fiber optic ribbon cables. The diffusor device includes:

a body 1 for containing, at a first level, the extension of the fiber optic ribbon, an optical coupler and an area for dividing the ribbon into the single fibers;

a body 2 for an upper closing;

a separator 3 for the second level;

a separator 4 for the third level;

a four-way sleeve 5 for the connectors SC-2;

a small block 6 for blocking the four-way sleeve 5;

a screw 7 for blocking the small block 6;

a semiconnector 8 SC-2;

a connector 9 MT4, of the push-on type;

a support 10 for a connector 9 MT4 push-on;

a blocking system 11 for the reinforced small tubes for the protection of the optical fibers;

a door 12 for access to the connector 9 MT4 push-on;

an indicator section 13;

a system 14 for containing the optical fiber ribbon;

a system 15 for fixing the card;

a ribbon 16 with four optical fibers (Ribbon);

an optical coupler 17;

a single fiber 18; and a single fiber 19 protected by a small reinforced tube.

Figure 5:
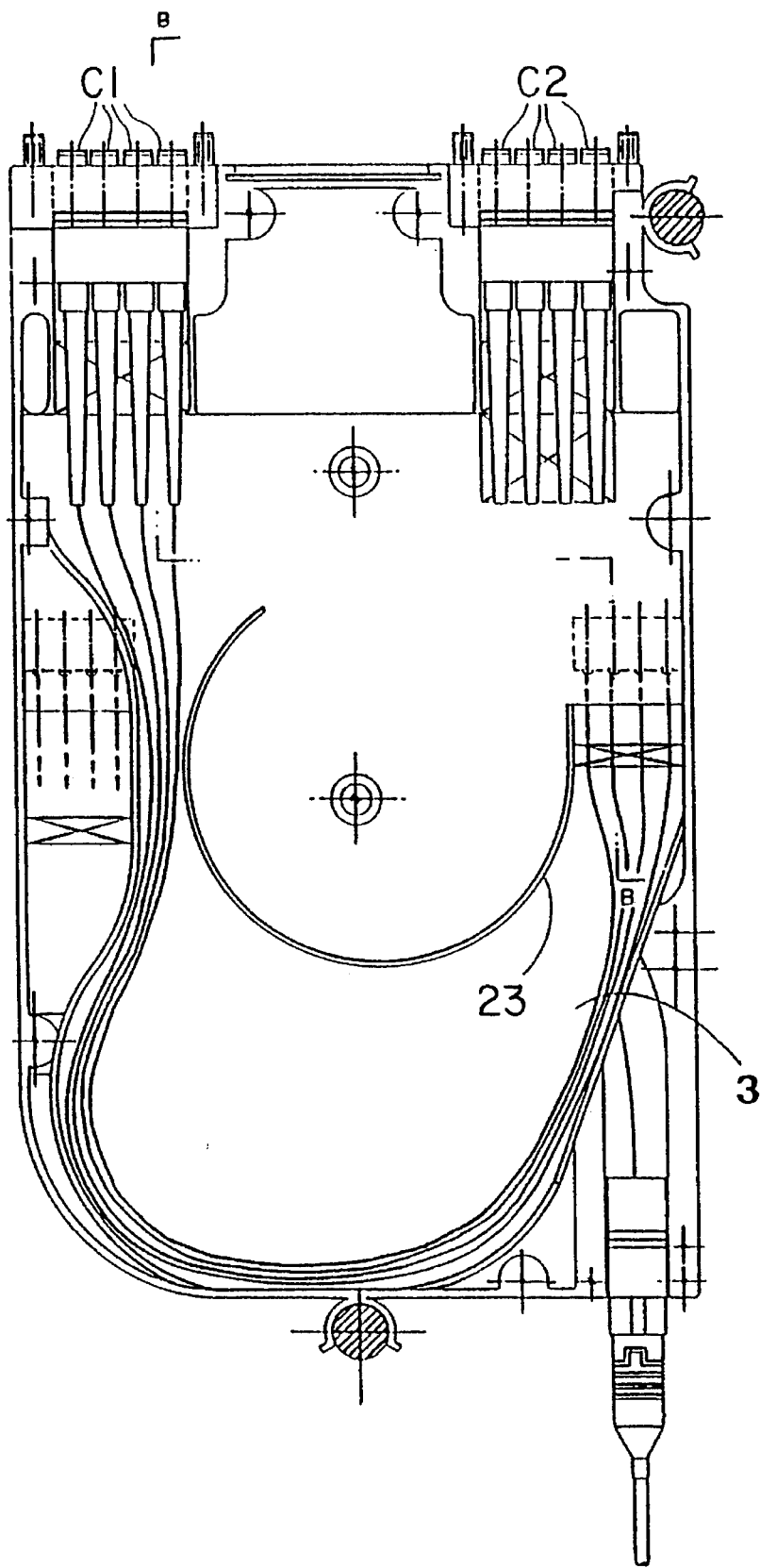

Relating now to the details shown in the figures, the diffusing device according to the present invention includes a card which connects with a semiconnector 9 MT4, of the push-on type. The card includes four semiconnectors 8, SC-2, which connect with a four-way sleeve 5, and the card may further contain an MT or fusion optical coupler 17. An additional four semiconnectors SC-2 with a corresponding four-way sleeve may be provided at the other side of the card, as shown in FIGS. 4 and 5.

The device according to the present invention allows a very easy extraction of the optical semiconnectors 8 from the card for cleaning thereof before the connecting phase. Access to the semiconnectors 8 is accomplished by opening the blocking system consisting of a restriction element 6 which fixes sleeve 5 to the base of the card by means of screws 7 of the kind which may be manually extracted or which may be extracted by means of a screw-driver.

A main feature of the device according to the present invention consists in the system 11 for blocking the reinforced small tubes for the protection of the optical fibers. This blocking system 11 will carry longitudinal stresses during the phase of traction of the semiconnectors 8.

Figure 6:
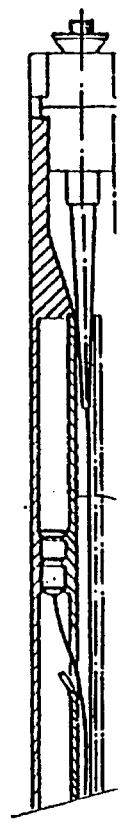

With respect to the structure of the device according to the present invention:

in the first level L1, all the housings are provided for the whole extension of the ribbon 16 and the single fibers 18 and 19, as shown in FIG. 4;

in the second level L2, as shown in FIGS. 5 and 6, the fibers are protected by the small separating tube 3, and the separating tube 3 provides a sliding plane in the phase of extracting the semiconnectors SC-2; on the same level L2, a shape structure 23 is provided for allowing the maximum extension of semiconnectors C1 on the apparatus side, while still assuring the minimum curving radius; and in the third level L3, as shown in FIGS. 7 and 8, the semiconnectors C2 of the measuring side and net control are positioned in a way similar to the precedent level L2.

The device according to the present invention has such a structure that in all of the passages, the minimum curving radius of the optical fibers is assured in the card for the optical fibers in a measure higher than required. From inlet A1, the ribbon 16 will be wound twice around the round groove 21 and enters into the optical coupler 17 from which two fibers get out. These fibers, in turn, are wound twice around the second circular groove 22 from which they get out, and, after a further turn around groove 21, reach the system 11 for blocking the reinforced small tubes 19 included with the system 11. The system 11 and small reinforced tubes 19 provide for the protection of the fibers from this point until they reach the end of the connection at semiconnectors SC-2 8.

In a possible variant, the device according to the present invention provides that the fiber optic ribbon 16 will be connected at the outlet from the circular groove 21, by means of a multiple connector MT4, instead of the mentioned optical coupler 17, from which one single ribbon is coming out, which in turn, runs twice through the groove 22 and once through groove 21. In this phase, the four optical fibers are parted from one another. Further, the four fibers of the ribbon 16 are introduced into the blocking system 11 as already described. In this case, the card has an inlet consisting of, instead of connector 9, a protection tube containing the fiber ribbon 16, and the apparatus side will have only one end having four semiconnectors SC-2.

In a further variant, the device according to the present invention provides the inlet directly from the net side, for the optical fiber ribbon, thus, the ribbon is connected to the diffusor by means of a multiple connector MT4, or by means of a fusion joint.

I claim:

1. A diffusing device for terminating an optical fiber ribbon cable, comprising: an extractable semiconnector integrated in a plastic card, said semiconnector for individually connecting all optical fibers of net side with those of an apparatus side, means for dividing one optical fiber ribbon cable into a set of single optical fibers, wherein the card includes a three level structure, in which:

in a first level, housings are provided for the optical fiber ribbon cable and the set of single fibers;

in a second level, a separating tube is provided for defining a sliding plane at which the semiconnectors are extracted from the plastic card; wherein, on the same plane, structures are provided to define a maximum extension of the semiconnector on the apparatus side, while still assuring minimum curving radius for the single fibers; and in third level, semiconnectors of a measuring side and a net control are connected with the single fibers.

2. A diffusing device for terminating an optical fiber ribbon cable, comprising:

a body for containing, at a first level, an extension of an optical fiber ribbon cable, wherein in the body, the optical fiber ribbon cable is unravelled into a plurality of single fibers;

an upper closing for the body;

a first separator for defining a second level in the body;

a second separator for defining a third level in the body;

a sleeve extractably connected to the body;

a semiconnector connecting to the sleeve;

a connector of a push-on type for connecting an optical fiber ribbon cable to the diffusing device;

a support for the connector of the push-on type;

a door for allowing access to the connector of the push-on type;

an indicator section; and an optical fiber ribbon cable connecting to the connector of the push-on type, wherein the optical fiber ribbon cable is introduced at the first level of the body of the diffusing device; wherein the optical fiber ribbon cable is divided into a plurality of single optical fibers which are connected to the semiconnector.

3. A diffusing device according to claim 2, wherein the body of the diffusing device is in the form of a card which receives one connector of the push-on type, and four semiconnectors are received within one sleeve.

4. A device according to claim 1, wherein the optical fiber ribbon cable is wound twice around a first circular groove and then enters into an optical coupler from which two single optical fibers come out, which, in turn, are twice wound around a second circular groove from which they come out, and, after a further turn around the first circular groove, reach a fiber optic protecting system including reinforced tubes into which the single optical fibers enter.

5. A device according to claim 1, wherein the optical fiber ribbon cable is wound around a first circular groove and then enters a multiple connector, from which the optical fiber ribbon cable comes out, which, in turn, runs twice around a second circular groove and then once around the first circular groove, and in this phase, four single optical fibers are parted from one another and introduced into reinforced tubes.

6. A device according to claim 1, wherein an inlet side of the diffusing device includes a protection tube containing the optical fiber cable ribbon, and the diffusing device includes a single semiconnector having four connectors.

7. A device according to claim 1, wherein the diffusing device further includes a sleeve fixed to a base of said card by means of a restriction element connected to the body by screws, so as to allow the semiconnector of the card to be extracted therefrom.

8. A device according to claim 4, wherein the reinforced tubes for the protection of the optical fibers allow the optical fibers to withstand longitudinal stresses generated during a traction phase of the semiconnector.

9. A device according to claim 1, wherein the optical fiber ribbon cable is connected to the diffusing device by means of a multiple connector or a fusion joint.

10. A device according to claim 2, wherein the optical fiber ribbon cable is wound twice around a first circular groove and then enters into an optical coupler from which two single optical fibers come out, which, in turn, are twice wound around a second circular groove from which they come out and, after a further turn around the first circular groove, enter a set of reinforced tubes.

11. A device according to claim 2, wherein the optical fiber ribbon cable is wound twice around a first circular groove, and at an outlet from the first circular groove, the optical fiber ribbon cable is connected to a multiple connector from which the ribbon comes out, which, in turn, runs twice around a second circular groove, and then once around the first circular groove, and in this phase, the optical fibers of the ribbon are parted from one another and introduced into a set of reinforced tubes.

12. A device according to claim 2, wherein the diffusing device has a single semiconnector having four connectors.

13. A device according to claim 5, wherein an inlet side of the diffusing device includes a protection tube containing the optical fiber ribbon cable, and the diffusion device includes a single semiconnector having four connectors.

14. A device according to claim 2, wherein the sleeve is fixed to a base of the diffusion device by means of a restriction element secured to the body by screws, so as to allow for extraction of the semiconnector.

15. A device according to claim 10, wherein the reinforced tubes for the protection of the optical fibers allow the optical fibers to withstand longitudinal stresses generated during a traction phase of the semiconnector.

16. A device according to claim 2, wherein the optical fiber ribbon cable is connected to the diffusing device by means of a multiple connector or a fusion joint.

* * * * *